(12) United States Patent
Jeon et al.

(10) Patent No.: US 7,502,055 B2
(45) Date of Patent: Mar. 10, 2009

(54) FILE MANAGEMENT METHOD OF DIGITAL PHOTOGRAPHING APPARATUS AND DIGITAL PHOTOGRAPHING APPARATUS PERFORMING THE SAME

(75) Inventors: Young-jun Jeon, Seongnam-si (KR); Kyung-tai Nam, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 754 days.

(21) Appl. No.: 11/024,173

(22) Filed: Dec. 28, 2004

(65) Prior Publication Data

US 2005/0140800 A1     Jun. 30, 2005

(30) Foreign Application Priority Data

Dec. 30, 2003    (KR) .................... 10-2003-0100620

(51) Int. Cl.
*H04N 5/76* (2006.01)
(52) U.S. Cl. ................ 348/231.2; 348/231.3
(58) Field of Classification Search ............ 348/231.99, 348/231.1, 231.2, 231.3, 231.6, 231.9
See application file for complete search history.

(56) References Cited

U.S. PATENT DOCUMENTS

| | | | | |
|---|---|---|---|---|
| 5,861,918 A * | 1/1999 | Anderson et al. | ........ | 348/231.9 |
| 6,683,649 B1 * | 1/2004 | Anderson | .............. | 348/333.05 |
| 6,943,841 B2 * | 9/2005 | Miyake et al. | ......... | 348/333.05 |
| 6,961,087 B1 * | 11/2005 | Yoshida | .................... | 348/231.1 |
| 6,992,672 B1 * | 1/2006 | Niikawa et al. | .............. | 345/530 |
| 7,027,171 B1 * | 4/2006 | Watanabe | .................... | 358/1.15 |
| 7,038,724 B2 * | 5/2006 | Satoh et al. | ............ | 348/333.05 |
| 7,295,230 B2 * | 11/2007 | Takahashi et al. | ......... | 348/231.1 |
| 2003/0011678 A1 * | 1/2003 | Chun | ......................... | 348/143 |
| 2004/0012693 A1 * | 1/2004 | Hayashi | .................... | 348/231.2 |
| 2004/0051788 A1 * | 3/2004 | Oka et al. | .............. | 348/211.99 |
| 2004/0119876 A1 | 6/2004 | Ohmori et al. | | |
| 2004/0156615 A1 * | 8/2004 | Funazaki | ..................... | 386/46 |
| 2004/0201749 A1 * | 10/2004 | Malloy Desormeaux | .......... | 348/231.99 |
| 2004/0212693 A1 * | 10/2004 | Wakabayashi | ........... | 348/231.1 |
| 2005/0093998 A1 * | 5/2005 | Haas et al. | ................ | 348/231.2 |

FOREIGN PATENT DOCUMENTS

| | | |
|---|---|---|
| JP | 09-214880 A | 8/1997 |
| JP | 10-304231 A | 11/1998 |
| JP | 2002-051242 A | 2/2002 |

* cited by examiner

*Primary Examiner*—Sinh N Tran
*Assistant Examiner*—Albert H Cutler
(74) *Attorney, Agent, or Firm*—Drinker Biddle & Reath LLP

(57) ABSTRACT

A method of managing files of a digital photographing apparatus and a digital photographing apparatus performing the file management method are provided. The file management method includes: photographing an image in a photographing mode, playing back stored image files in a playback mode, selecting an image file to be deleted according to a manipulation by a user in the playback mode, and deleting the image file from a storage medium after the playback mode is changed to the photographing mode.

21 Claims, 7 Drawing Sheets

FILE MANAGEMENT METHOD OF DIGITAL PHOTOGRAPHING APPARATUS AND DIGITAL PHOTOGRAPHING APPARATUS PERFORMING THE SAME

BACKGROUND OF THE INVENTION

This application claims the priority of Korean Patent Application No. 2003-100620, filed on Dec. 30, 2003, in the Korean Intellectual Property Office, the disclosure of which is incorporated herein in its entirety by reference.

1. Field of the Invention

The present invention relates to a digital photographing apparatus, and more particularly, to the management of a file to be deleted from a digital photographing apparatus.

2. Description of the Related Art

A general digital photographing apparatus is disclosed in U.S. Pat. Pub. No. 2004/119,876 entitled "Method of Notification of Inadequate Picture Quality," which was filed by the present applicant and published in 2004.

In a general digital photographing apparatus, a file which has already been deleted cannot be recovered; therefore, the general digital photographing apparatus requires a deletion confirmation process including several steps to delete a file. In addition, in the general digital photographing apparatus, existing image files must be deleted prior to capturing new images in order to secure a space for storing the new images. Thus, although a memory may have remaining available space after photographing, a user cannot recover files that have already been deleted.

SUMMARY OF THE INVENTION

The present invention provides a digital photographing apparatus which does not immediately delete a file that is selected to be deleted in a playback mode from a memory card but deletes the file under a predetermined condition to provide a convenient file deletion function to a user and a method of managing the file.

According to an aspect of the present invention, there is provided a file management method of a digital photographing apparatus, including: photographing an image in a photographing mode; playing back stored image files in a playback mode; selecting an image file to be deleted according to a manipulation by a user while in the playback mode; and deleting the image file from a storage medium after the playback mode is changed to the photographing mode.

According to another aspect of the present invention, there is provided a digital photographing apparatus including: a storage medium storing image files; a display displaying the image files in a thumbnail view wherein an image file selected to be deleted is distinguished from the unselected image files; a direction key moving a cursor in the thumbnail view; a deletion key selecting an image file on which the cursor is positioned to delete the image file; a recovery key recovering the image file selected to be deleted; a mode key selecting photographing and playback modes; and a deletion prearrangement buffer storing information relating to the image file selected to be deleted. Here, the image file associated with the information stored in the deletion prearrangement buffer is deleted from the storage medium after the playback mode is changed to the photographing mode by pressing the mode key.

According to another aspect of the present invention, there is provided a digital photographing apparatus including: a storage medium storing image files; a display displaying the image files in a thumbnail view wherein an image file selected to be deleted is distinguished from the other unselected image files; a direction key moving a cursor in the thumbnail view; a deletion key selecting an image file on which the cursor is positioned to delete the image file; a mode key selecting photographing and playback modes; and a deletion prearrangement buffer storing information relating to the image file selected to be deleted. Here, the image file associated with the information stored in the deletion prearrangement buffer is deleted from the storage medium after the playback mode is changed to the photographing mode by pressing the mode key.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
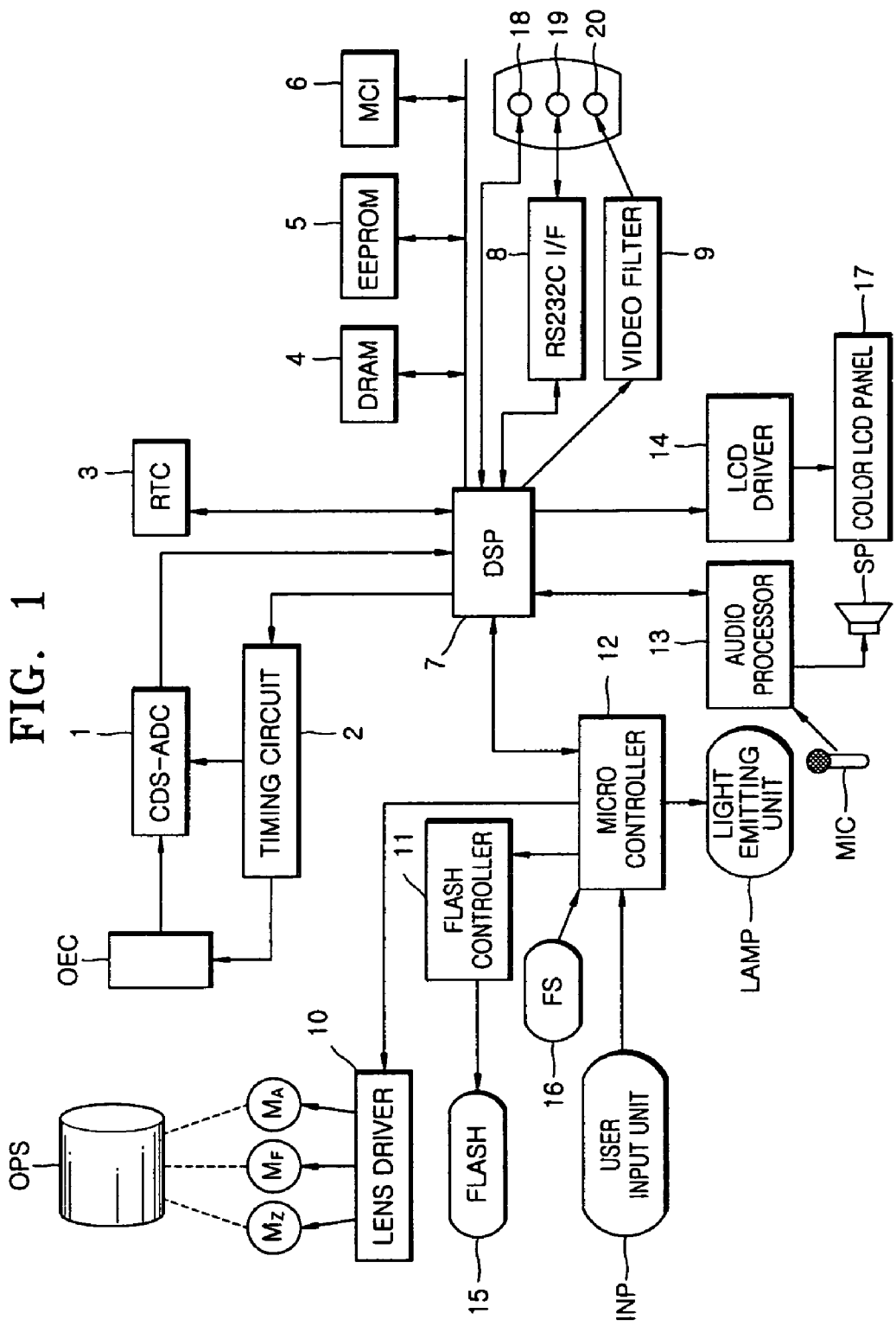
FIG. 1 is a block diagram of a digital photographing apparatus according to an embodiment of the present invention.

Hereinafter a digital photographing apparatus and a method of managing files of the digital photographing apparatus will be described in detail with reference to the attached drawings. Like reference numerals in the drawings denote like elements.

The fundamental concept of the present invention is that a deletion operation performed in a playback mode is not immediately reflected on a storage medium. Instead, the contents of the file subject to the deletion operation are temporarily recorded in a deletion prearrangement buffer in a digital photographing apparatus, and then a file recorded in the deletion prearrangement buffer is deleted from the storage medium after the playback mode is changed to a photographing mode.

An embodiment of a digital photographing apparatus according to the present invention is shown in FIG. 1. Referring to FIG. 1, an optical system (OPS) including a lens unit and a filter unit optically processes light reflected from a subject. The lens unit in the OPS includes a zoom lens, a focus lens, and a compensation lens.

An optoelectric converter (OEC) of a Charged Coupled Device (CCD) or a Complementary Metal-Oxide-Semiconductor (CMOS) converts the light irradiated from the OPS into an electric analog signal. Here, a digital signal processor (DSP) 7 controls a timing circuit 2 to control operations of the OEC and a correction double sampler and analog-to-digital converter (CDS-ADC) 1. The CDS-ADC 1 processes the electric analog signal output from the OEC to remove high frequency noise from the electric analog signal, adjusts the amplitude of the electric analog signal, and converts the electric analog signal into a digital signal. The DSP 7 processes the digital signal output from the CDS-ADC 1 to produce a digital image signal which is divided into luminance and chromaticity signals.

A Dynamic Random Access Memory (DRAM) 4 temporarily stores the digital image signal output from the DSP 7 and other temporarily processed data.

An Electrically Erasable Programmable Read Only Memory (EEPROM) 5 stores algorithm and setting data necessary for operating the DSP 7. A user memory card is attached to or detached from a memory card interface (MCI) 6.

The digital image signal output from the DSP 7 is input to a liquid crystal display (LCD) driver 14 to allow a color LCD panel 17 to display an image.

The digital image signal output from the DSP 7 may be transmitted in a serial communication via a Universal Serial Bus (USB) connector 18 or a RS232C interface (I/F) 8 and a RS232C I/F connector 19. The digital signal output from the DSP 7 may also be transmitted as a video signal via a video filter 9 and a video output unit 20.

An audio processor 13 can relay sound from a microphone MIC to the DSP 7 or a speaker SP. In addition, the audio processor 13 can output an audio signal output from the DSP 7 to the speaker SP.

A user input unit INP may include a shutter button, a mode selection button, a function selection button, a zoom button, a direction movement button, and the like. The user input unit INP is manipulated by a user to generate a command necessary for performing each function according to an instruction of the user. In the present invention, the mode selection button toggles photographing and playback modes. The mode selection button also reflects a file deletion operation in the playback mode on a memory card after the playback mode is changed to the photographing mode.

A microcontroller 12 controls a lens driver 10 to allow a zoom motor $M_Z$, a focus motor $M_F$, and an aperture motor $M_A$ to drive, respectively, the zoom lens, the focus lens, and an aperture in the OPS. A light emitting unit LAMP is driven by the microcontroller 12 and includes lamps such as a self-timer lamp, an auto-focus lamp, and a flash standby lamp. The microcontroller 12 receives a signal from a flash sensor (FS) 16 and thereby controls the operation of a flash controller 11 to drive a flash 15.

Some embodiments of digital photographing apparatuses according to the present invention may not include all of the elements shown in FIG. 1. Thus, it will be understood by those of ordinary skill in the art that the digital photographing apparatus may include only some of the elements or may further include additional elements according to its specification and that some of the elements may be modified into other forms.

Figure 2:
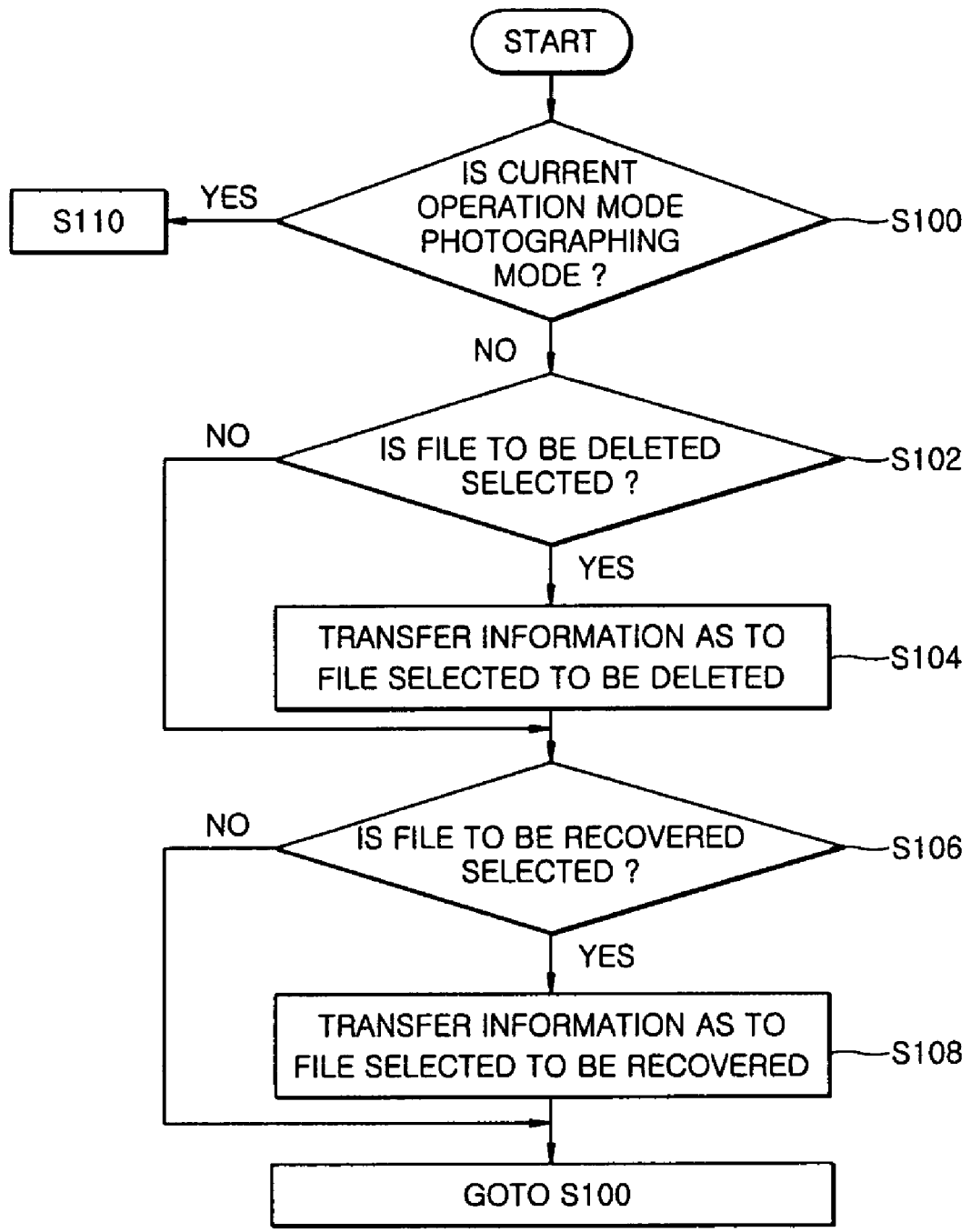
FIG. 2 is a flowchart of a file management method performed in a digital photographing apparatus according to an embodiment of the present invention.

FIG. 2 is a flowchart illustrating a file management method performed in a digital photographing apparatus according to an embodiment of the present invention. Referring to FIG. 2, a digital photographing apparatus employing an embodiment of the file management method first determines whether a current operation mode is a photographing mode (S100). If the current operation mode is not the photographing mode, i.e., the current operation mode is a playback mode, a determination is made as to whether the user has selected a file to be deleted (S102). If it is determined that a file to be deleted is selected, information relating to the file selected to be deleted is transferred to a deletion prearrangement buffer (S104).

In step S106, a determination is made as to whether the user has selected a file to be recovered. If the user has selected a file to be recovered, information regarding the file selected for recovery is removed from the deletion prearrangement buffer (S108). After performing step S108, the process returns to step S100 to determine whether the current operation mode has changed to the photographing mode. If it is determined in step S100 that the current operation mode has changed to the photographing mode, the process proceeds to step S110. Additionally, although not shown in FIG. 2, playback-related operations may be performed according to an instruction of the user after step S108. A user may give such an instruction, for example, by pressing another playback-related function key of the digital photographing apparatus.

Figure 3:
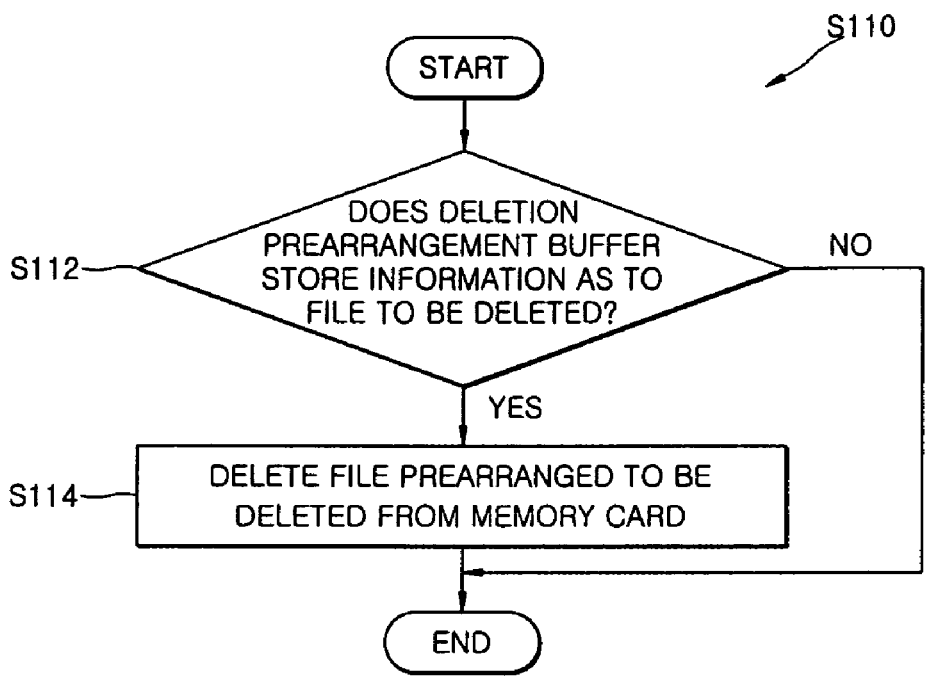
FIG. 3 is a flowchart illustrating an embodiment of step S110 of the file management method of FIG. 2.

FIG. 3 is a flowchart illustrating step S110 of the file management method of FIG. 2, according to an embodiment of the present invention.

If the playback mode is changed to the photographing mode in step S100 of FIG. 2, step S110 is performed. In step S110, a file is substantially deleted from a storage medium such as a memory card. Step S110 includes steps S112 and S114. In step S112, a determination is made whether the deletion prearrangement buffer includes information as to the file to be deleted. If the deletion prearrangement buffer includes information as to a file to be deleted, step 114 is performed and the file prearranged to be deleted is deleted from the memory card. As a result of performing step 114, the memory card has a physically empty space. Finally, step S110 ends if the deletion prearrangement buffer does not include information as to a file to be deleted (S112) or after deletion of the file if such information does exist (S114).

If step S110 ends, the digital photographing apparatus enters a standby mode and may perform photographing, recording, playing, or the like according to an instruction of the user. Although not shown, the process may also return to step S100 of FIG. 2 to re-perform the file management method of the digital photographing apparatus according to the present invention.

Figure 4:
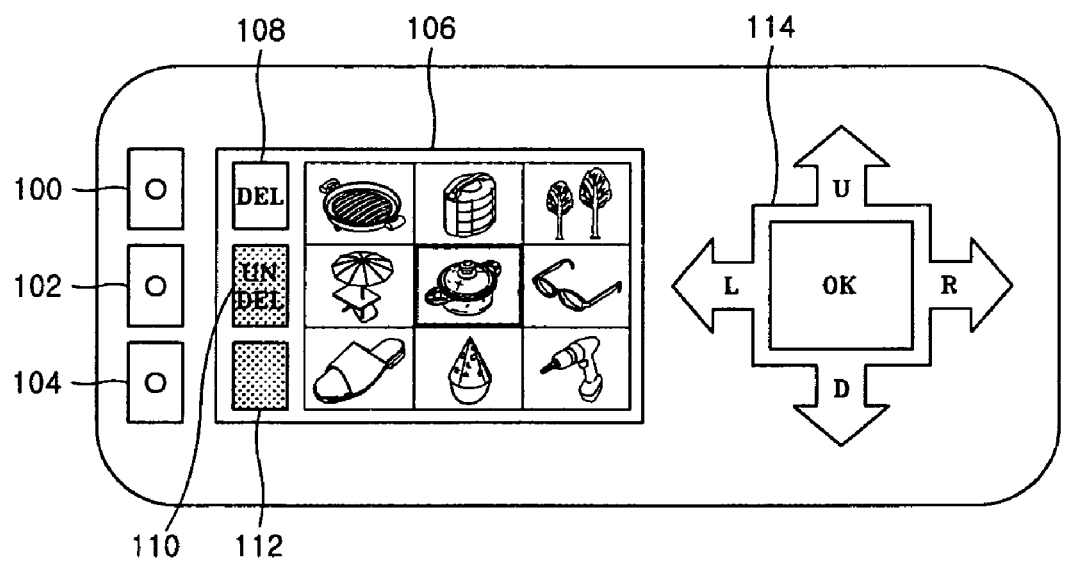
FIG. 4 is a back view of an embodiment of a digital photographing apparatus according to the present invention and illustrates a process of selecting a file to be deleted in a playback mode of the digital photographing apparatus.

FIG. 4 shows the back side of the digital photographing apparatus and illustrates a process of selecting a file to be deleted in the playback mode of the digital photographing apparatus, according to an embodiment of the present invention. Referring to FIG. 4, the digital photographing apparatus includes a storage medium (not shown), a deletion key 100, a recovery key 102, a display 106, and a direction key 114.

The storage medium stores an image folder storing image files and information as to the image files. The storage medium may be a memory card, a flash memory, or the like. The image folder will be described later with reference to FIG. 6.

Figure 5:
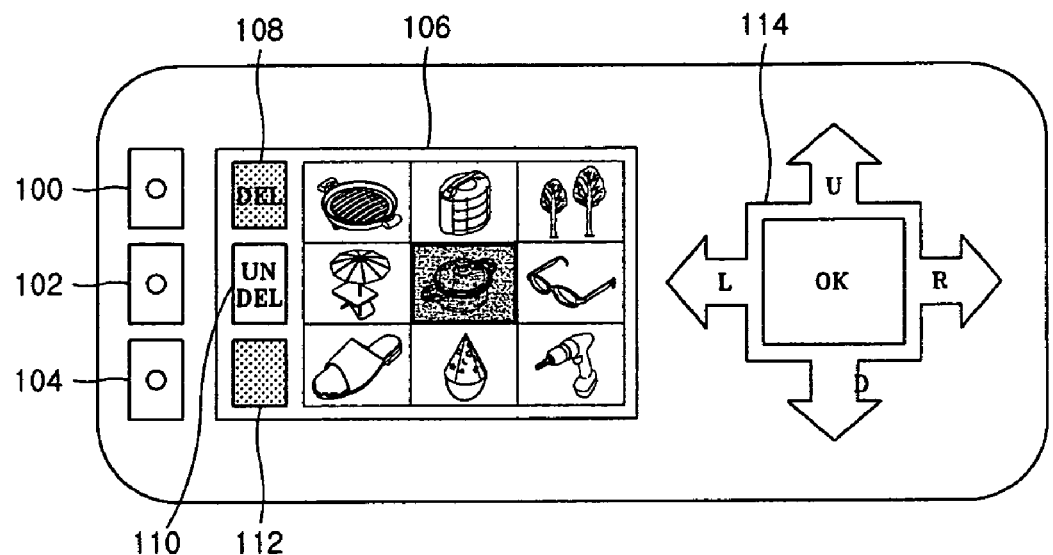
FIG. 5 is a back view illustrating a thumbnail view of a display screen after a fifth file is selected to be deleted in FIG. 4.

Although not shown in FIG. 4, the digital photographing apparatus includes a mode key for selecting photographing and playback modes. In the present invention, when the mode key is pressed, the memory card reflects a deletion selection operation performed in the playback mode as illustrated in FIGS. 4 and 5.

The display 106 displays the image files stored in the storage medium in a thumbnail view and distinguishes an image file selected to be deleted from the other unselected image files. As an example of the thumbnail view, the display 106 shown in FIGS. 4 and 5 displays 9 image files in the thumbnail view.

In the thumbnail view displayed by the display 106, the direction key 114 is manipulated by the user to transfer a cursor from the thumbnail view of one image to the thumbnail view of another image.

The deletion key 100 is manipulated by the user to select an image file to be deleted in the thumbnail view on which the cursor is positioned.

The recovery key 102 is manipulated by the user to recover the image file of an image in the thumbnail view on which the cursor is positioned when the image was previously selected to be deleted.

When a user presses the deletion key 100 to select an image file for deletion, the image folder stored in the image management folder in the storage medium is transferred to a recycle bin folder.

The user manipulates the playback key 104 to play back the image file displayed in the thumbnail view on which the cursor is positioned. A playback display 112 may display whether the playback key 104 is usable.

A process of selecting an image file to be deleted will now be described with reference to FIG. 4.

In the thumbnail view of the display 106, the user transfers the cursor to the position of the image file to be deleted using the up U, down D, left L, and right R keys of the direction key 114. Here, the cursor is marked with a thick frame as shown in FIG. 4 to distinguish the image file to be deleted from the other image files. The cursor may move up and down and to the left and right via the direction key 114. In FIG. 4, the cursor is positioned on a fifth image file of a "cooking pot." The display 106 may display whether the recovery key 102 is activated by displaying "DEL" 108 when the recovery key 102 is inactivated and displaying "UNDEL" 110 when the recovery key is activated. When the recovery key 102 is activated, the recovery key 102 performs its function according to the manipulation of the user. When the recovery key 102 is inactivated, the recovery key 102 does not perform its function according to the manipulation of the user. As shown in FIG. 4, the activation display "DEL" 108 is bright and the inactivation display "UNDEL" 110 is dark to represent that the deletion key 100 is activated and the recovery key 102 is inactivated. Thus, in FIG. 4, when the user presses the deletion key 100, the fifth image file (the "cooking pot") is selected to be deleted. If a file is selected to be deleted, the file is not immediately deleted from the storage medium. Instead, the information relating to the file is transferred to the deletion prearrangement buffer. The deletion prearrangement buffer may be embodied as a portion of a DRAM 4 in the digital photographing apparatus shown in FIG. 1.

FIG. 5 illustrates the appearance of the thumbnail view after the fifth image file, the "cooking pot," is selected for deletion in FIG. 4. Here, an image file selected to be deleted is displayed differently from the other image files in the thumbnail view, for example, displayed to be dim. Also, while the cursor remains positioned on the fifth image file which has been selected to be deleted, the deletion key 100 is inactivated, and the recovery key 102 is activated. The display 106 may display whether the deletion key 100 or the recovery key 102 are activated by displaying "DEL" 108 when the deletion key is activated or "UDEL" 110 when the recovery key is activated. If the user presses the recovery key 102 in the state shown in FIG. 5, the fifth image file is recovered, and the display of the image file is changed from being dim back to its original state as shown in FIG. 4.

In an embodiment of the present invention, a two-step process is used for a selected image file to be deleted. First, the image file is selected by a selection key OK which is part of the direction key 114. Next, the image file is selected to be deleted by pressing the deletion key 100.

Figure 6:
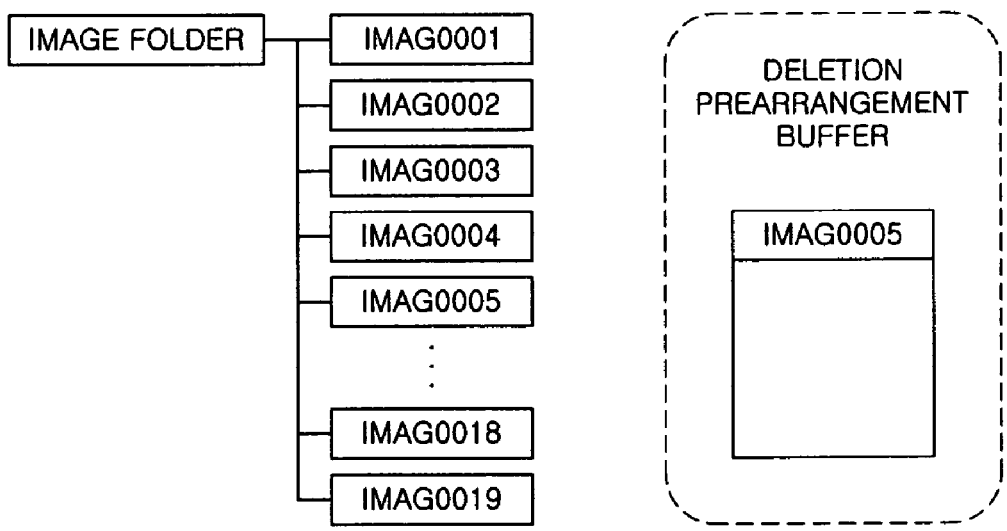
FIG. 6 illustrates a file list depicting the states of an image folder and a deletion prearrangement buffer of a memory card in the state shown in FIG. 5.

FIG. 6 illustrates a file list indicating the states of the image folder and the deletion prearrangement buffer of the storage medium in the state shown in FIG. 5;

When the fifth image file, the "cooking pot," is selected to be deleted as shown in FIG. 5, the fifth image file is not immediately deleted from the memory card. In other words, the fifth image file IMAG0005 remains in the image folder. However, information relating to the fifth image file IMAG0005 is recorded in the deletion pre arrangement buffer. When a final deletion condition or instruction is input, the fifth image file IMAG0005 is then in a state of being deleted from the memory card.

Figure 7:
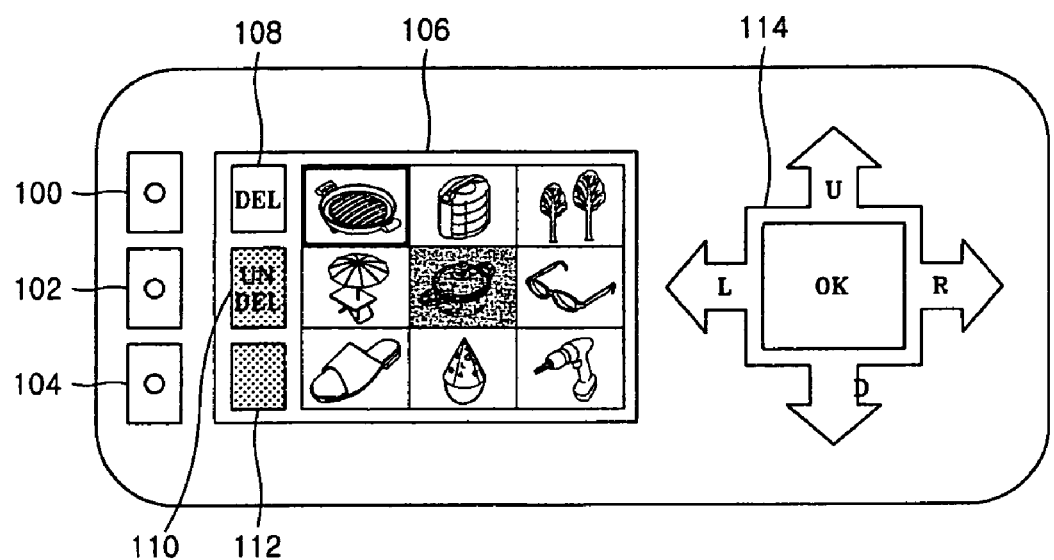
FIG. 7 is a back view illustrating a process of selecting two or more files to be deleted by a user.

FIG. 7 is a back view of the digital photographing apparatus illustrating a process of selecting two or more image files to be deleted by the user.

In the state shown in FIG. 5, the user manipulates the direction key 114 to transfer the cursor to a position of a first image file. Here, the user may select the deletion key 100 on the activation display "DEL" 108 to select the first image file, the "cooking grill," to be deleted in addition to the fifth image file.

Figure 8:
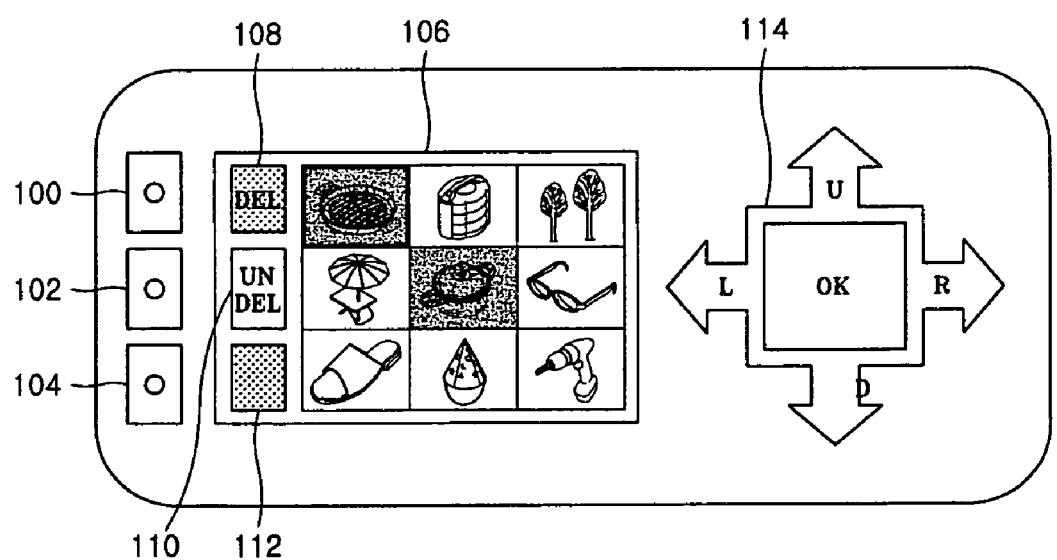
FIG. 8 illustrates the thumbnail view after a first file is selected to be deleted in FIG. 7.

FIG. 8 illustrates the thumbnail view after the first image file, the "cooking grill," is selected to be deleted in FIG. 7. The first image file selected to be deleted is now dim in the thumbnail view. While the cursor remains positioned on the first image file selected to be deleted, the deletion key 100 is inactivated, and the recovery key 102 is activated. Thus, in FIG. 8, both the first and fifth image files are selected to be deleted. If the user presses the recovery key 102 in the state shown in FIG. 8, the first image file (the "cooking grill") is recovered, and the display of the image file is changed from being dim back to its original state as shown in FIG. 7.

In another embodiment of the present invention, the process illustrated and described with reference to FIGS. 7 and 8 can be modified. In this alternate embodiment, for a selection of two or more image files to be deleted, the two or more image files may be first selected by the selection key OK of the direction key 114 and then selected to be deleted at the same time by pressing of the deletion key 100.

Figure 9:
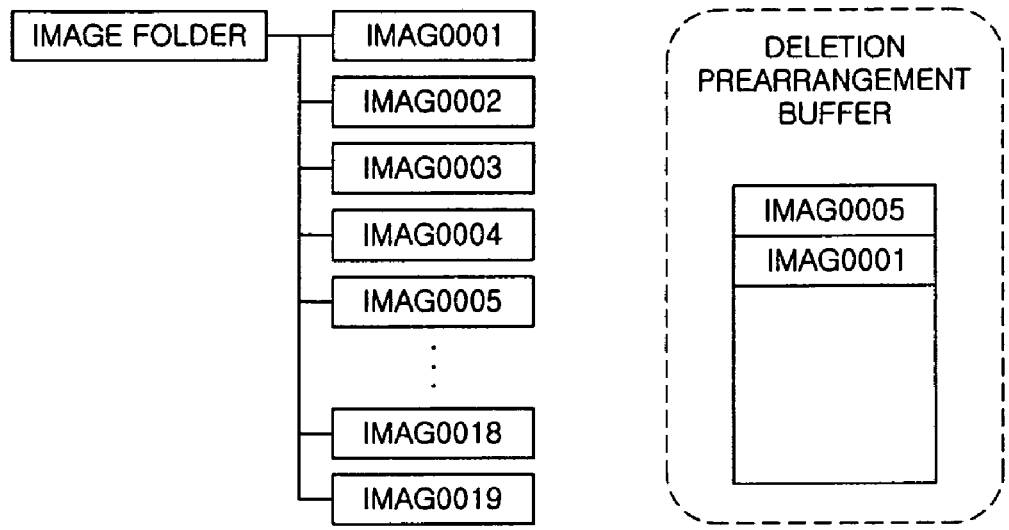
FIG. 9 illustrates a file list depicting the states of the image folder and the deletion prearrangement buffer of the memory card in the state shown in FIG. 8.

FIG. 9 illustrates a file list displaying the states of the image folder and the deletion prearrangement buffer of the memory card in the state shown in FIG. 8.

The file list of FIG. 9 is the same as the file list of FIG. 6 except that the first image file IMAG0001 has been added to the deletion prearrangement buffer. In other words, although the first and fifth image files IMAG001 and IMAG0005 remain in the image folder, information relating to these files has been recorded in the deletion prearrangement buffer. As a result, when a final deletion condition or instruction is input, the first and fifth image files IMAG001 and IMAG0005 will be deleted from the memory card.

Figure 10:
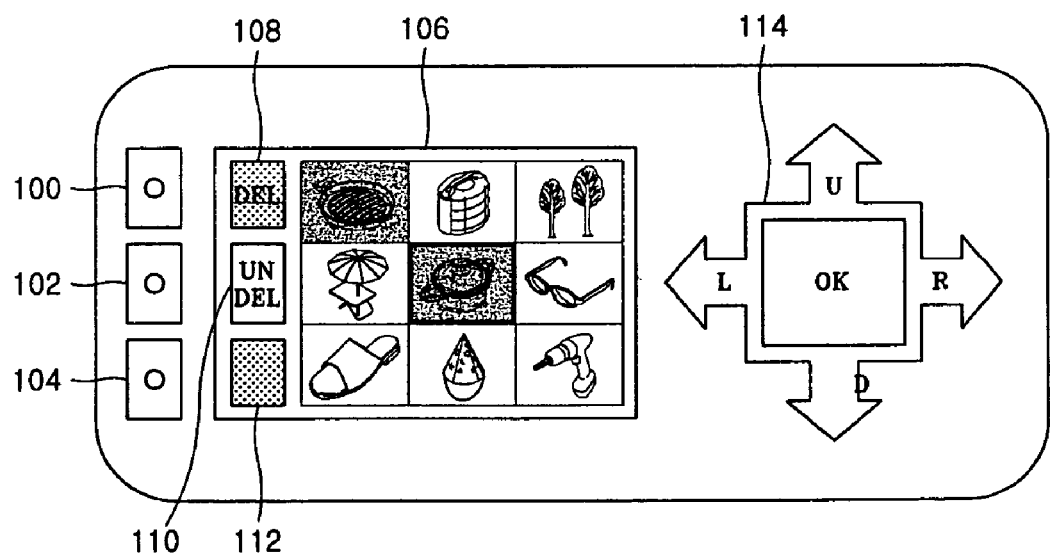
FIG. 10 is a back view illustrating a process of recovering a file selected to be deleted.

FIG. 10 is a back view of the digital photographing apparatus illustrating a process of recovering an image file selected to be deleted.

Referring to FIG. 10, the user manipulates the direction key 114 in the state shown in FIG. 8 to transfer the cursor to the position of the fifth image file. The user may then select the recovery key 102 to recover the fifth image file, which was previously selected to be deleted.

Figure 11:
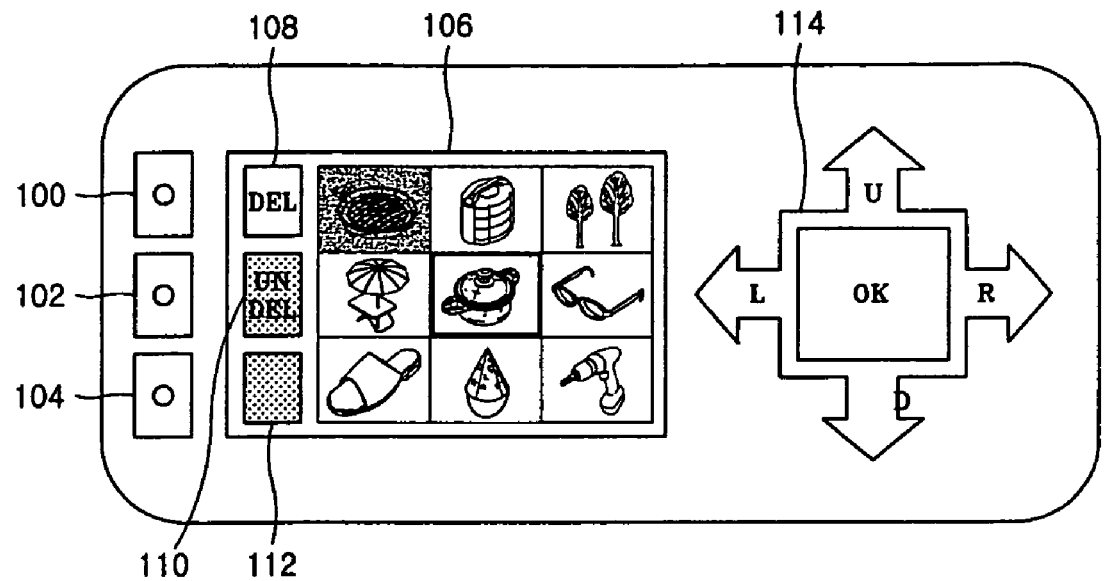
FIG. 11 illustrates the thumbnail view after the fifth file is recovered in FIG. 10.

FIG. 11 illustrates the thumbnail view after the fifth image file is recovered 5 in FIG. 10. Referring to FIG. 11, the fifth image file is recovered to its original state. In addition, the deletion key 100 is now active, as indicated by the brightened "DEL" 108 on the display 106, and the recovery key 102 is now inactive, as indicated on the display 106 by the darkened state of "UNDEL" 110.

Figure 12:
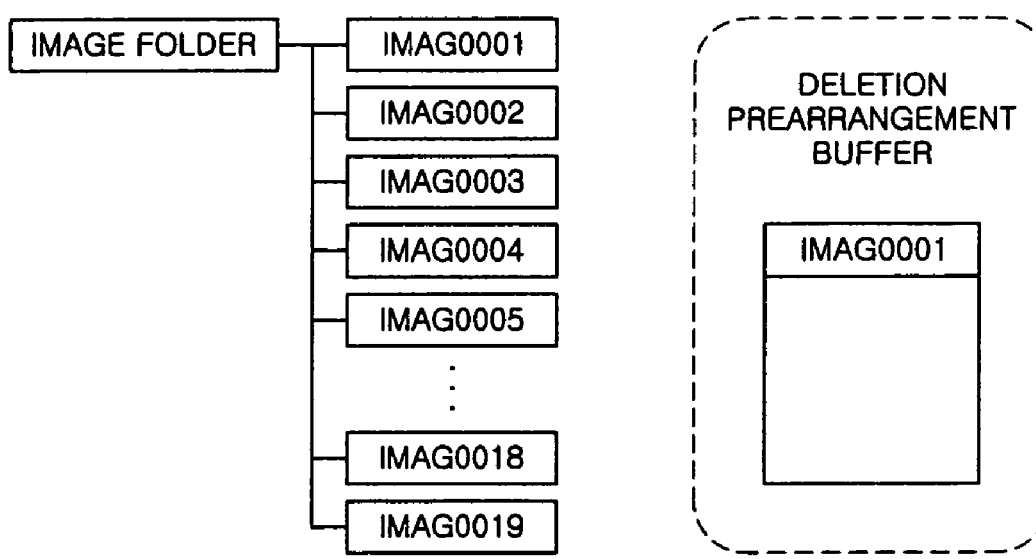
FIG. 12 illustrates a file list depicting the states of the image folder and the deletion prearrangement buffer of the memory card in the state shown in FIG. 11.

FIG. 12 illustrates a file list indicating the states of the image folder and the deletion prearrangement buffer of the memory card in the state shown in FIG. 11. The file list shown in FIG. 12 differs from the file list shown in FIG. 9 in that the fifth image file IMAG0005 is deleted from the deletion prearrangement buffer.

As described with reference to FIGS. 4 through 12, an image file may be selected to be deleted or recovered in a playback mode. However, this selection for deletion or recovery does not effect an immediate change of a file structure in the image folder of the memory card. Instead, files are selected to be deleted in the playback mode, and information relating to the files is recorded in the deletion prearrangement buffer as shown in FIGS. 6, 9, and 12. The files are deleted from the image folder and the memory card after the playback is changed to a photographing mode.

In the previously-described embodiments, a storage medium in the form of a memory card has been discussed. However, it will be understood by those of ordinary skill in the art that the storage medium is not limited to the memory card but may be a flash card or the like instead.

In the previously-described embodiments, the digital photographing apparatus includes the deletion key 100 and the recovery key 102, and a deletion selection operation is performed according to the manipulation of the deletion key 100 or the recovery key 102 in the playback mode. However, the deletion key 100 and the recovery key 102 may be integrated into one key. For the description of this embodiment, referring to FIG. 4 again, it is assumed that only the deletion key 100 exists, and the recovery key 102 and its associated activation display "UNDEL" 110 do not exist.

The deletion key 100 selects an image file on which the cursor is positioned in order to delete the image file. The deletion key 100 performs a deletion selection function before the image file on which the cursor is positioned is selected to be deleted. During this deletion selection process, the display 106 displays the activation display "DEL" 108, i.e., a deletion function of the deletion key 100.

After the image file on which the cursor is positioned is selected to be deleted, the function of the deletion key 100 is altered so that it now performs a recovery function of recovering the image file previously selected for deletion. Here, the text shown in the activation display 108 which is displayed in the display 106 may be changed from "DEL" to "UNDEL" to display the recovery function of the deletion key 100.

Although not shown in the figures, in an embodiment of the present invention, the display 106 may also display a capacity of the image file selected to be deleted. For example, on the upper right portion of the display 106, an indicator may display the amount of available space which will exist on the memory card following the deletion of the currently-selected file. An exemplary method of creating such a display is to indicate the number of photos which the memory card has room to store. The amount of available space is equal to the sum of the size of the image file selected to be deleted and the capacity of currently available space in the storage medium. Thus, if no file is currently selected and the memory card has room to store two new photos, "2" is displayed on the upper right portion of the display 106 of FIG. 4. If an image file is selected to be deleted in the playback mode as shown in FIG. 5, however, "3" is displayed to indicate the sum of the two currently available spaces and the number (one) of the image files selected to be deleted is displayed on the upper right portion of the display 106. Thus, when the image file selected to be deleted is deleted, the display 106 may display the number, "3", of times photographing can be performed. If the user selects the recovery key 102 in the state shown in FIG. 5 to release the image file from being selected to be deleted, "2" is displayed again on the upper right portion of the display 106.

The size of an image file selected to be deleted and the capacity of an available space of a storage medium may be displayed as a number of times photographing can be performed as previously described or may be displayed as a length of time required for photographing a moving picture or a length of time required for recording the moving picture. Also, the display of the size of the image file in a playback mode may be performed based upon the operation of a photographing mode that is set immediately before the playback mode is set. In other words, if photographing is performed in the photographing mode, the size of the image file selected to be deleted in the playback mode may be displayed as the number of times photographing can be performed once the image file is deleted. In an alternative embodiment, if photographing or recording of the moving picture is performed in a moving picture photographing mode, the size of the image file selected to be deleted in the playback mode may be displayed as the time required for photographing or recording the moving picture. Moreover, the size of the image file in the playback mode may be displayed as the number of times photographing can be performed or the time required for photographing or recording the moving picture according to an instruction of a user. A digital photographing apparatus may further include an additional key with which the user inputs such an instruction.

As described above, in a digital photographing apparatus according to the present invention, an image file that is selected to be deleted in a playback mode is not immediately deleted from a storage medium, for example, a memory card. Instead, the image file can be deleted from the storage medium after the playback mode is changed to a photographing mode. As a result, a user can be provided with a convenient file deletion function.

The invention can also be embodied as computer readable codes on a computer readable recording medium. The computer readable recording medium is any data storage device that can store a program or data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and so on. The program refers to a series of commands that are directly or indirectly used in a device having an information processing capability, such as a computer or the like, to obtain a specific result. The computer is any device having an information processing capability of performing a specific function through the program using a recording medium, an input/output unit, and an operation device. Thus, the computer includes a microprocessor of a digital photographing apparatus, and the recording medium includes a storage device such as ROM connected to the micro processor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing files of a digital photographing apparatus, comprising:
   photographing an image in a photographing mode;
   storing at least one image file in a storage medium;
   playing back stored image files in a playback mode;
   selecting an image file to be deleted according to a manipulation by a user in the playback mode; and
   deleting the selected image file from a storage medium in response to the playback mode being changed to the photographing mode every time the playback mode is changed to the photographing mode and an image file to be deleted has been selected.

2. The file management method of claim 1, further comprising: recording information relating to the selected image file in a deletion prearrangement buffer.

3. The file management method of claim 1, wherein the selected image file is distinguished from unselected image files when the image files are displayed in a thumbnail view.

4. The file management method of claim 1, wherein a selection of an image file for deletion can be canceled before the playback mode is changed to the photographing mode.

5. The file management method of claim 1, further comprising: displaying information regarding a storage capacity of the storage medium.

6. The file management method of claim 5, wherein the information regarding a storage capacity of the storage medium is comprised of:
   a size of the selected image file; or
   a sum of the size of the selected image file and a storage capacity of currently available space in a storage medium.

7. The file management method of claim 6, wherein the size of the selected image file is measured in terms of a number of times photographing can be performed based upon the settings of the digital photographing apparatus.

8. The file management method of claim 6, wherein the size of the selected image file is measured in terms of a length of time required for photographing a moving picture.

9. The file management method of claim 6, wherein the size of the selected image file is measured in terms of a length of time required for recording a moving picture.

10. A computer-readable recording medium having embodied thereon a computer program for causing a computer to perform the method of claim 1.

11. The file management method of claim 1, wherein the method steps are performed sequentially.

12. A digital photographing apparatus comprising:
   a storage medium which stores image files;
   a display which displays the image files in a thumbnail view wherein an image file selected to be deleted is distinguishable from unselected image files;
   a direction key which moves a cursor between image files in the thumbnail view;
   a deletion key which selects an image file in which the cursor is positioned to delete the image file;
   a recovery key which recovers an image file selected to be deleted;
   a mode key which selects a photographing mode and a playback mode; and
   a deletion prearrangement buffer which stores information relating to the image file selected to be deleted,
   wherein the image file associated with the information stored in the deletion prearrangement buffer is deleted from the storage medium in response to the playback mode being changed to the photographing mode by pressing the mode key, the deleting being performed every time the playback mode is changed to the photographing mode and an image file to be deleted has been selected.

13. The digital photographing apparatus of claim 12, wherein the recovery key is activated and the deletion key is inactivated when the cursor is positioned on the image file selected to be deleted.

14. The digital photographing apparatus of claim 12, wherein the recovery key is inactivated and the deletion key is activated when the cursor is positioned on an unselected image file.

15. The digital photographing apparatus of claim 12, wherein the display displays a status of the deletion key or the recovery key.

16. The digital photographing apparatus of claim 12, wherein the display displays a size of the image file selected to be deleted.

17. A digital photographing apparatus comprising:
   a storage medium storing image files;
   a display which displays the image files in a thumbnail view wherein an image file selected to be deleted is distinguishable from unselected image files;
   a direction key which moves a cursor between image files in the thumbnail view;
   a deletion key which selects an image file on which the cursor is positioned to delete the image file;
   a mode key which selects photographing and playback modes; and
   a deletion prearrangement buffer which stores information relating to the image file selected to be deleted,
   wherein the image file associated with the information stored in the deletion prearrangement buffer is deleted from the storage medium in response to the playback mode being changed to the photographing mode by pressing the mode key, the deleting being performed every time the playback mode is changed to the photographing mode and an image file to be deleted has been selected.

18. The digital photographing apparatus of claim 17, wherein the display displays a deletion function of the deletion key.

19. The digital photographing apparatus of claim 17, wherein when the cursor is positioned on an image file selected to be deleted, the deletion key changes functions such that it performs a recovery function for recovering the image file selected to be deleted instead of performing a deletion selection function.

20. The digital photographing apparatus of claim 19, wherein the display displays the recovery function of the deletion key.

21. The digital photographing apparatus of claim 17, wherein the display displays a size of the image file selected to be deleted.

* * * * *